(12) United States Patent
Sadakane

(10) Patent No.: US 8,316,831 B2
(45) Date of Patent: Nov. 27, 2012

(54) CONTROL DEVICE FOR INTERNAL COMBUSTION ENGINE AND CONTROL METHOD FOR INTERNAL COMBUSTION ENGINE

(75) Inventor: Shinji Sadakane, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 323 days.

(21) Appl. No.: 12/699,295

(22) Filed: Feb. 3, 2010

(65) Prior Publication Data

US 2010/0192925 A1 Aug. 5, 2010

(30) Foreign Application Priority Data

Feb. 4, 2009 (JP) ................... 2009-024166

(51) Int. Cl.
*F02B 25/06* (2006.01)
*F02B 25/00* (2006.01)
(52) U.S. Cl. ........................ 123/572; 123/574
(58) Field of Classification Search .................. 123/572, 123/573, 574, 520, 521, 704, 481, 198 F, 123/90.15, 325, 332; 701/112
See application file for complete search history.

(56) References Cited

U.S. PATENT DOCUMENTS

| | | | | |
|---|---|---|---|---|
| 3,175,546 A | * | 3/1965 | Roper | 123/572 |
| 4,102,314 A | * | 7/1978 | Sarto | 123/572 |
| 5,964,207 A | * | 10/1999 | Clauss et al. | 123/572 |
| 6,748,916 B2 | * | 6/2004 | Schaefer-Siebert | 123/198 F |
| 7,017,554 B2 | | 3/2006 | Wang | |
| 7,275,527 B2 | * | 10/2007 | Bruchner et al. | 123/572 |
| 2004/0216449 A1 | * | 11/2004 | Szymkowicz et al. | 60/284 |
| 2005/0000496 A1 | * | 1/2005 | Norrick | 123/563 |
| 2008/0257320 A1 | * | 10/2008 | Asanuma et al. | 123/573 |
| 2009/0241922 A1 | * | 10/2009 | Okada | 123/573 |

FOREIGN PATENT DOCUMENTS

| | | |
|---|---|---|
| JP | 2005207307 A | 8/2005 |
| JP | 2006207496 | 8/2006 |
| JP | 2006299929 A | 11/2006 |
| JP | 2007092649 A | 4/2007 |
| JP | 2007231865 A | 9/2007 |

* cited by examiner

*Primary Examiner* — Mahmoud Gimie
(74) *Attorney, Agent, or Firm* — Gifford, Krass, Sprinkle, Anderson & Citkowski, P.C.

(57) ABSTRACT

An engine includes: a valve stop mechanism that varies the number of operating cylinders as a cylinder cut-off mechanism; and a blow-by gas recirculation system that has a blow-by gas passage that returns blow-by gas, flowing from a combustion chamber to a crankcase, to an intake passage and a PCV valve that is equipped with an electric motor and that adjusts the flow rate of gas returned to the blow-by gas passage. A control device variably sets the opening degree, corresponding to a target value of the flow rate of gas, of the PCV valve on the basis of an intake pressure in an intake passage to adjust the opening degree of the PCV valve so that the flow rate of gas becomes the target value.

11 Claims, 10 Drawing Sheets

CONTROL DEVICE FOR INTERNAL COMBUSTION ENGINE AND CONTROL METHOD FOR INTERNAL COMBUSTION ENGINE

INCORPORATION BY REFERENCE

The disclosure of Japanese Patent Application No. 2009-024166 filed on Feb. 4, 2009 including the specification, drawings and abstract is incorporated herein by reference in its entirety.

BACKGROUND OF THE INVENTION

1. Field of the Invention

The invention relates to a control device for an internal combustion engine and a control method for an internal combustion engine.

2. Description of the Related Art

In an internal combustion engine mounted on a vehicle, such as an automobile, part of air-fuel mixture or combustion gas present in its combustion chamber may leak into a crank chamber as a so-called blow-by gas. The blow-by gas leaking into the crank chamber may degrade engine oil and, by extension, degrade the internal combustion engine. Then, a blow-by gas recirculation system is provided to return such blow-by gas to an intake passage to be subjected to re-combustion in the combustion chamber during operation of the internal combustion engine.

The blow-by gas recirculation system is formed of a blow-by gas passage, a flow rate control valve, and the like. The blow-by gas passage returns blow-by gas, flowing from the combustion chamber into the crank chamber, back to the intake passage. The flow rate control valve adjusts the flow rate of gas returned through the blow-by gas passage. Then, the flow rate control valve may be, for example, a negative pressure flow rate control valve that uses pressure in the intake passage, that is, intake pressure, to change its opening degree. In the above negative pressure flow rate control valve, the flow rate of gas is controlled on the basis of an intake pressure.

Here, for example, the amount of blow-by gas increases as an engine load increases, and an intake pressure increases as the engine load increases. Thus, the opening degree characteristic of the negative pressure flow rate control valve is regulated so that the flow rate of blow-by gas increases as the intake pressure increases because of an increase in engine load.

On the other hand, in place of the above negative pressure flow rate control valve, as described in Japanese Patent Application Publication No. 2006-207496 (JP-A-2006-207496), there has been known a flow rate control valve, or the like, equipped with an actuator. The flow rate control valve is able to selectively adjust its opening degree. In the above flow rate control valve with an actuator, the opening degree may be adjusted selectively irrespective of an intake pressure, so it is possible to further appropriately adjust the flow rate of gas.

Incidentally, there has been known an internal combustion engine that has a cylinder cut-off mechanism or a variable valve mechanism. The cylinder cut-off mechanism stops the operation of a portion of cylinders among all cylinders. The variable valve mechanism changes various valve characteristics, such as the maximum valve lift, valve opening duration or valve timing of an intake valve.

In an internal combustion engine with no such mechanisms, the relationship between the engine load and the intake pressure is substantially uniquely defined (as the engine load increases, the intake pressure increases (the negative pressure in the intake passage decreases)). Thus, the negative pressure flow rate control valve, of which the flow rate of gas is adjusted on the basis of an intake pressure, is also able to appropriately adjust the flow rate of gas on the basis of an engine load, that is, adjust the flow rate of gas on the basis of the amount of blow-by gas.

However, in the internal combustion engine with any one of the above described mechanisms, the intake pressure varies not only depending on an engine load but also depending on the number of operating cylinders and/or a valve characteristic. For example, in the internal combustion engine with the cylinder cut-off mechanism, the opening degree of a throttle valve is controlled so that, as the number of operating cylinders reduces, the amount of intake air per cylinder increases. Thus, as the number of operating cylinders reduces, the intake pressure in the intake passage increases. Thus, even when the opening degree of the flow rate control valve is the same, the flow rate of gas is reduced as the number of operating cylinders is reduced. In addition, in the internal combustion engine with the variable valve mechanism that changes the maximum valve lift and/or valve opening duration of each intake valve, the amount of intake air may be adjusted by changing the maximum valve lift and/or the valve opening duration in place of adjusting the amount of intake air by the throttle valve. Thus, in this internal combustion engine as well, the intake pressure corresponding to the engine load changes on the basis of a maximum valve lift and/or a valve opening duration. In addition, in the internal combustion engine with the variable valve mechanism that changes the valve timing of each intake valve, the pressure in the intake passage varies by changing the valve timing. Thus, in this internal combustion engine as well, the intake pressure corresponding to the engine load varies on the basis of a valve timing.

Thus, in the internal combustion engine with any one of the above mechanisms, when the above negative pressure flow rate control valve is used, it may be difficult to appropriately control the flow rate of gas. For example, as the flow rate of gas excessively increases, oil component contained in blow-by gas also excessively returns to the intake passage, so there is a concern that the amount of oil consumption inconveniently increases. In addition, as the flow rate of gas excessively reduces, scavenging of the inside of the crank chamber stagnates, so there is a concern that degradation of engine oil is inconveniently accelerated.

On the other hand, the flow rate control valve with an actuator is able to selectively adjust its opening degree irrespective of an intake pressure, so it is possible to appropriately control the flow rate of gas. However, application of the system described in JP-A-2006-207496 to an internal combustion engine with any one of the mechanisms, in which the relationship between the engine load and the intake pressure is not uniquely defined, is not taken into consideration. Therefore, in the internal combustion engine with the cylinder cut-off mechanism or the variable valve mechanism that changes the valve characteristic of each intake valve, when the flow rate control valve with an actuator is provided, there is still room for improvement in controlling the opening degree of the flow rate control valve.

SUMMARY OF THE INVENTION

The invention provides a control device and control method for an internal combustion engine with a cylinder cut-off mechanism or a variable valve mechanism that changes the valve characteristic of an intake valve, wherein the control device and control method are able to appropriately control the flow rate of blow-by gas when a flow rate control valve with an actuator is provided to adjust the flow rate of blow-by gas.

A first aspect of the invention provides a control device for an internal combustion engine that includes: a blow-by gas passage that returns blow-by gas, flowing from a combustion chamber to a crank chamber, to an intake passage; a flow rate control valve that adjusts a flow rate of gas returned to the blow-by gas passage; an actuator that adjusts an opening degree of the flow rate control valve so that the flow rate of gas becomes a target value; and at least one of a cylinder cut-off mechanism that reduces the number of operating cylinders and a variable valve mechanism that varies a valve characteristic of an intake valve. The control device includes: a variable flow rate control valve opening degree setting unit that variably sets an opening degree of the flow rate control valve, corresponding to the target value, on the basis of an intake pressure in the intake passage.

With the above configuration, in the internal combustion engine with the cylinder cut-off mechanism or the variable valve mechanism, the opening degree of the flow rate control valve, corresponding to the target value of the flow rate of gas returned to the blow-by gas passage, is variably set on the basis of an intake pressure in the intake passage. Therefore, in the internal combustion engine of which the relationship between the engine load and the intake pressure is not uniquely defined because any one of the above mechanisms is provided, when the flow rate control valve with an actuator is provided to adjust the flow rate of blow-by gas, it is possible to appropriately control the flow rate of blow-by gas.

A second aspect of the invention provides a control device for an internal combustion engine that includes a blow-by gas passage that returns blow-by gas, flowing from a combustion chamber to a crank chamber, to an intake passage; a flow rate control valve that adjusts a flow rate of gas returned to the blow-by gas passage; an actuator that adjusts an opening degree of the flow rate control valve so that the flow rate of gas becomes a target value; and a cylinder cut-off mechanism that reduces the number of operating cylinders. The control device includes a variable flow rate control valve opening degree setting unit that variably sets an opening degree of the flow rate control valve, corresponding to the target value, on the basis of the number of operating cylinders.

In the internal combustion engine with the cylinder cut-off mechanism, the intake pressure in the intake passage varies on the basis of the number of operating cylinders. Then, with the above configuration, in the internal combustion engine with the cylinder cut-off mechanism, the opening degree of the flow rate control valve, corresponding to the target value of the flow rate of gas returned to the blow-by gas passage, is variably set on the basis of the number of operating cylinders. Therefore, in the internal combustion engine of which the relationship between the engine load and the intake pressure is not uniquely defined because the cylinder cut-off mechanism is provided, when the flow rate control valve with an actuator is provided to adjust the flow rate of blow-by gas, it is possible to appropriately control the flow rate of blow-by gas. In addition, with the above configuration, without providing a sensor, which detects an intake pressure, in the intake passage, the flow rate of gas may be appropriately controlled.

A third aspect of the invention provides a control device for an internal combustion engine that includes a blow-by gas passage that returns blow-by gas, flowing from a combustion chamber to a crank chamber, to an intake passage; a flow rate control valve that adjusts a flow rate of gas returned to the blow-by gas passage; an actuator that adjusts an opening degree of the flow rate control valve so that the flow rate of gas becomes a target value; and a variable valve mechanism that varies a valve characteristic of an intake valve. The control device includes: a variable flow rate control valve opening degree setting unit that variably sets an opening degree of the flow rate control valve, corresponding to the target value, on the basis of the valve characteristic of the intake valve.

In the internal combustion engine with the variable valve mechanism, the intake pressure in the intake passage varies on the basis of the valve characteristic of the intake valve. Then, with the above configuration, in the internal combustion engine with the variable valve mechanism, the opening degree of the flow rate control valve, corresponding to the target value of the flow rate of gas returned to the blow-by gas passage, is variably set on the basis of the valve characteristic. Therefore, in the internal combustion engine of which the relationship between the engine load and the intake pressure is not uniquely defined because the variable valve mechanism is provided, when the flow rate control valve with an actuator is provided to adjust the flow rate of blow-by gas, it is possible to appropriately control the flow rate of blow-by gas. In addition, with the above configuration, without providing a sensor, which detects an intake pressure, in the intake passage, the flow rate of gas may be appropriately controlled.

A fourth aspect of the invention provides a control method for an internal combustion engine that includes: a blow-by gas recirculation system that has a blow-by gas passage that returns blow-by gas, flowing from a combustion chamber to a crank chamber, to an intake passage, and a flow rate control valve that adjusts a flow rate of gas returned to the blow-by gas passage; and at least one of a cylinder cut-off mechanism that reduces the number of operating cylinders and a variable valve mechanism that varies a valve characteristic of an intake valve. The control method includes: loading an engine rotational speed and engine load of the internal combustion engine; calculating a required flow rate of blow-by gas on the basis of the loaded engine rotational speed and the loaded engine load; loading an intake pressure in the intake passage; calculating an opening degree of the flow rate control valve on the basis of the loaded intake pressure and the calculated required flow rate; and adjusting an opening degree of the flow rate control valve so as to become the calculated opening degree of the flow rate control valve.

With the fourth aspect of the invention, in the internal combustion engine with the cylinder cut-off mechanism or the variable valve mechanism, the opening degree of the flow rate control valve, corresponding to the target value of the flow rate of gas returned to the blow-by gas passage, is variably set on the basis of the intake pressure in the intake passage. Therefore, in the internal combustion engine of which the relationship between the engine load and the intake pressure is not uniquely defined because the above steps are executed, it is possible to appropriately control the flow rate of blow-by gas.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, a control device for an internal combustion engine according to a first embodiment of the invention will be described with reference to FIG. 1 to FIG. 4.

Figure 1:
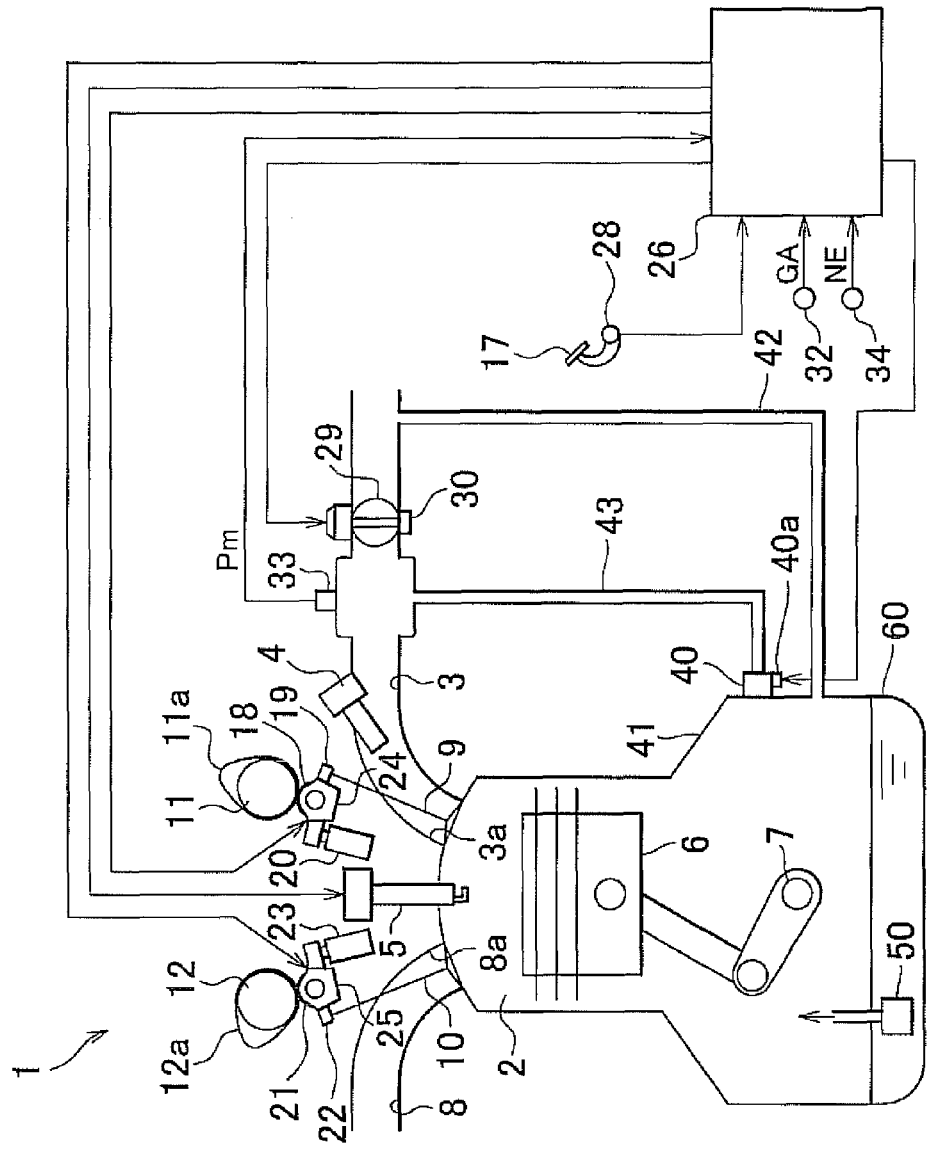
FIG. 1 is a schematic view that shows an internal combustion engine, to which a control device for an internal combustion engine according to a first embodiment of the invention is applied, and its peripheral configuration.

An engine 1 shown in FIG. 1 is a multi-cylinder internal combustion engine having a plurality of cylinders. By adjusting the opening degree of a throttle valve 29 provided in an intake passage 3 of the engine 1 on the basis of an amount by which an accelerator pedal 17 is depressed (accelerator operation amount), or the like, air of an amount corresponding to the opening degree of the throttle valve 29 is supplied to a combustion chamber 2 of each cylinder via the intake passage 3. In addition, fuel of an amount corresponding to the intake air amount of the engine 1 is injected and supplied from a fuel injection valve 4 to the intake passage 3 of the engine 1. As a result, an air-fuel mixture formed of air and fuel fills the combustion chamber 2 of each cylinder in the engine 1. As the air-fuel mixture is ignited by an ignition plug 5, the air-fuel mixture burns to reciprocally move a piston 6 to thereby cause a crankshaft 7, which is an output shaft of the engine 1, to rotate. Then, the burned air-fuel mixture is discharged from each combustion chamber 2 to an exhaust passage 8 as exhaust gas.

An oil pan 60 that stores oil is provided for the engine 1. A pump 50 is provided inside the oil pan 60. Then, oil in the oil pan 60 is supplied to working portions of the engine 1 as the oil is pumped by the pump 50. Oil subjected to lubrication, or the like, of working portions, for example, flows on an inner wall of the engine 1 and then drops to be accumulated in the oil pan 60.

In each cylinder of the engine 1, fluid communication between the combustion chamber 2 and the intake passage 3 is allowed or shut off as an intake valve 9 opens or closes, and fluid communication between the combustion chamber 2 and the exhaust passage 8 is allowed or shut off as an exhaust valve 10 opens or closes. These intake valve 9 and exhaust valve 10 respectively open or close as an intake camshaft 11 and an exhaust camshaft 12 rotate. Rotation of the crankshaft 7 is transmitted to the intake camshaft 11 and the exhaust camshaft 12. More specifically, each intake valve 9 is urged in a valve closing direction by an intake valve spring, and a rocker arm 19 with a roller 18 is provided between an intake cam 11a fixed to the intake camshaft 11 and the intake valve 9. Then, as the rotating intake cam 11a presses the roller 18, the rocker arm 19 rocks about a contact point at which the rocker arm 19 contacts a lash adjuster 20 that supports one end of the rocker arm 19, and presses the intake valve 9 against reaction force of the intake valve spring. The intake valve 9 is opened or closed as the intake valve 9 is pressed by the rocker arm 19 and is urged by the reaction force of the intake valve spring. In addition, each exhaust valve 10 is urged in a valve closing direction by an exhaust valve spring. A rocker arm 22 with a roller 21 is provided between an exhaust cam 12a fixed to the exhaust camshaft 12 and the exhaust valve 10. Then, as the rotating exhaust cam 12a presses the rocker arm 22, the rocker arm 22 rocks about a contact point at which the rocker arm 22 contacts a lash adjuster 23 that supports one end of the rocker arm 22, and presses the exhaust valve 10 against reaction force of the exhaust valve spring. The exhaust valve 10 is opened or closed as the exhaust valve 10 is pressed by the rocker arm 22 and is urged by the reaction force of the exhaust valve spring.

In the engine 1, in addition to all-cylinder operation in which all cylinders are operated, so-called reduced cylinder operation is carried out. In the reduced cylinder operation, operation of a portion of cylinders is stopped and only the remaining cylinders are operated to, for example, improve fuel economy. The reduced cylinder operation is performed in such a manner that, in a portion of cylinders in the engine 1, fuel injection from the fuel injection valve 4 is stopped and energization of the ignition plug 5 for igniting air-fuel mixture is stopped, and the opening and closing operations of the intake valve 9 and exhaust valve 10 are stopped. The opening and closing operations of the intake valve 9 and exhaust valve 10 are stopped by respective valve stop mechanisms 24 and 25 provided for the rocker arms 19 and 22.

The valve stop mechanism 24 provided for the rocker arm 19 between the intake cam 11a and the intake valve 9 is able to stop lifting (opening and closing) of the intake valve 9 caused by the intake cam 11a pressing the rocker arm 19 (roller 18).

When the valve stop mechanism 24 is activated, the roller 18 is movable in the direction, in which the roller 18 is pressed, with respect to the rocker arm 19. When the valve stop mechanism 24 is not activated, the above relative movement is restricted. When the valve stop mechanism 24 is not activated, relative movement of the roller 18 with respect to the rocker arm 19 is restricted. Therefore, as the roller 18 is pressed by the intake cam 11a, the rocker arm 19 rocks as described above to cause the intake valve 9 to open or close. On the other hand, when the valve stop mechanism 24 is activated, the roller 18 moves with respect to the rocker arm 19. Therefore, as the roller 18 is pressed by the intake cam 11a, the roller 18 moves with respect to the rocker arm 19 and, so-to-speak, moves without causing the rocker arm 19 to rock. Thus, rocking of the rocker arm 19 is stopped. By so doing, lifting of the intake valve 9 attended with rotation of the intake cam 11a is stopped, so the intake valve 9 is closed.

The valve stop mechanism 25 provided for the rocker arm 22 between the exhaust cam 12a and the exhaust valve 10 is able to stop lifting (opening and closing) of the exhaust valve 10 caused by the exhaust cam 12a pressing the rocker arm 22 (roller 21).

The valve stop mechanism 25 also has a structure similar to that of the above described valve stop mechanism 24. When the valve stop mechanism 25 is activated, the roller 21 is movable in the direction, in which the roller 21 is pressed, with respect to the rocker arm 22. When the valve stop mechanism 25 is not activated, the above relative movement is restricted. When the valve stop mechanism 25 is not activated, relative movement of the roller 21 with respect to the rocker arm 22 is restricted. Therefore, as the roller 21 is pressed by the exhaust cam 12a, the rocker arm 22 rocks as described above to cause the exhaust valve 10 to open or close. On the other hand, when the valve stop mechanism 25 is activated, the roller 21 moves with respect to the rocker arm 22. Therefore, as the roller 21 is pressed by the exhaust cam 12a, the roller 21 moves with respect to the rocker arm 22 and, so-to-speak, moves without causing the rocker arm 22 to rock. Thus, rocking of the rocker arm 22 is stopped. By so doing, lifting of the exhaust valve 10 attended with rotation of the exhaust cam 12a is stopped, so the exhaust valve 10 is also closed.

Note that the valve stop mechanisms 24 and 25 constitute the cylinder cut-off mechanism that reduces the number of operating cylinders in the engine 1. The engine 1 is provided with a fresh air introducing passage 42 and a gas exhaust passage 43.

The fresh air introducing passage 42 provides fluid communication between the intake passage 3, at a portion upstream of the throttle valve 29, and a crankcase 41. The gas exhaust passage 43 provides fluid communication between the intake passage 3, at a portion downstream of the throttle valve 29, and the crankcase 41. These fresh air introducing passage 42 and gas exhaust passage 43 constitute a blow-by gas passage.

In addition, a PCV valve 40, which serves as a flow rate control valve, is provided in the gas exhaust passage 43. The PCV valve 40 is an electrically-driven control valve that uses an electric motor 40a as an actuator. The passage cross-sectional area of the gas exhaust passage 43 may be varied by controlling the opening degree of the PCV valve 40.

In the present embodiment, these fresh air introducing passage 42, gas exhaust passage 43 and PCV valve 40 constitute a blow-by gas recirculation system that discharges blow-by gas in the crankcase 41 to the intake passage 3 for recirculation. Note that the blow-by gas is gas (including fuel) that leaks from each combustion chamber 2 into the crankcase 41 via a gap between a piston ring and cylinder inner wall surface of the engine 1 in a compression stroke or expansion stroke of the engine 1.

The blow-by gas recirculation system uses a difference between a pressure downstream of the throttle valve 29 in the intake passage 3 (so-called intake pressure) and a pressure in the crankcase 41 to discharge gas in the crankcase 41 (including blow-by gas) to the intake passage 3 via the gas exhaust passage 43. In addition, a difference between a pressure in the crankcase 41, which decreases with discharge of gas to the intake passage 3, and a pressure upstream of the throttle valve 29 in the intake passage 3 is used to introduce fresh air in the intake passage 3 into the crankcase 41 via the fresh air introducing passage 42. By so doing, the inside of the crankcase 41 is scavenged. Furthermore, the amount of gas discharged to the intake passage 3 of the engine 1 is adjusted by controlling the PCV valve 40 (PCV control). Note that, when the amount of blow-by gas excessively increases, for example, during high load operation, gas (including blow-by gas) in the crankcase 41 is discharged to the intake passage 3 via the fresh air introducing passage 42.

As shown in FIG. 1, the operating state, and the like, of the engine 1 is detected by various sensors. For example, an accelerator position sensor 28 detects the amount by which the accelerator pedal 17 is depressed by a driver of an automobile (accelerator operation amount). In addition, a throttle position sensor 30 detects the opening degree of the throttle valve 29 (throttle opening degree) provided in the intake passage 3. In addition, an air flow meter 32 detects the amount of air introduced into the combustion chambers 2 via the intake passage 3 (intake air amount GA). An intake pressure sensor 33 detects the intake pressure Pm downstream of the throttle valve 29. In addition, a crank position sensor 34 detects the rotation angle of the crankshaft 7, that is, the crank angle, and the engine rotational speed NE is calculated on the basis of the detected signal.

Various controls of the engine 1 are executed by a control device 26. The control device 26 includes a CPU, a ROM, a RAM, input and output ports, and the like. The CPU executes processing for the various controls. The ROM stores programs and data necessary for the controls. The RAM temporarily stores processing results of the CPU. The input and output ports are used to input and output signals from and to external devices. Signal lines of the above various sensors are connected to the input port. In addition, driving circuits, and the like, of the fuel injection valves 4, the ignition plugs 5, the throttle valve 29, the PCV valve 40 and the valve stop mechanisms 24 and 25 are connected to the output port. The control device 26 outputs instruction signals to the various driving circuits connected to the output port on the basis of the engine operating state detected by the various sensors. In this way, the control device 26 carries out fuel injection control of the fuel injection valves 4, ignition timing control of the ignition plugs 5, opening degree control of the throttle valve 29, opening degree control of the PCV valve 40, driving control of the valve stop mechanisms 24 and 25, and the like.

Figure 2:
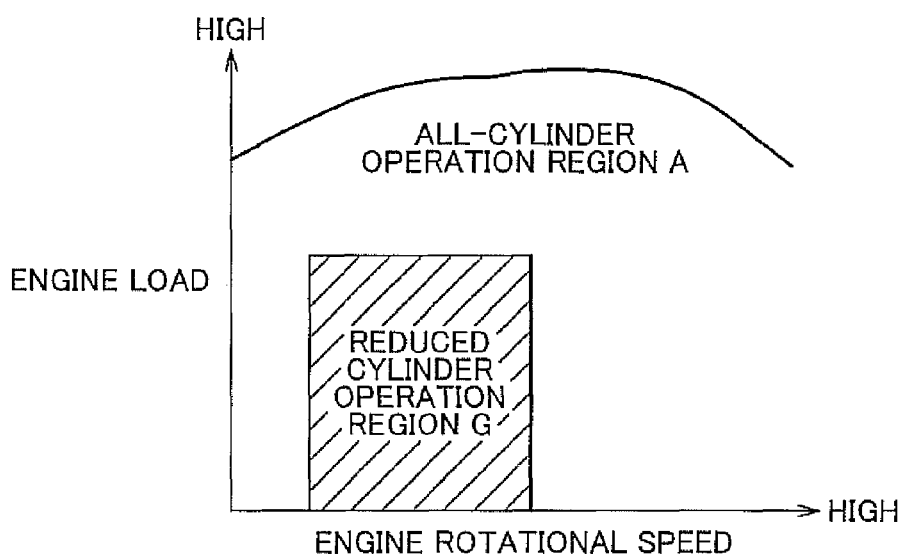
FIG. 2 is a conceptual graph that shows an all-cylinder operation region and a reduced cylinder operation region.

The reduced cylinder operation and all-cylinder operation of the engine 1 are switched on the basis of the engine operating state. That is, as shown in FIG. 2, when the engine operating state acquired on the basis of the engine rotational speed and the engine load is in a low rotational speed and low load state and falls within a predetermined reduced cylinder operation region G, the reduced cylinder operation is executed. Note that, as the reduced cylinder operation is executed in a region in which the engine rotational speed is excessively low, fluctuations in torque output from the engine 1 become remarkable. Therefore, in the present embodiment, the reduced cylinder operation region G does not include an extremely low rotational speed region.

During the reduced cylinder operation, fuel injection by the fuel injection valves 4 and ignition by the ignition plugs 5 are stopped for a portion of cylinders, while the opening and closing of the intake valve 9 and exhaust valve 10 of each cylinder, for which fuel injection and ignition are stopped, are stopped by activating the valve stop mechanisms 24 and 25. In this way, during a low rotational speed and low load, that is, under a condition that the amount of air (air-fuel mixture) introduced into the operating cylinders per cycle reduces, the operation of a portion of the cylinders is stopped by reduced cylinder operation. Thus, the amount of air (air-fuel mixture) introduced into the remaining operating cylinders per cycle is increased. As a result, in each operating cylinder during reduced cylinder operation, the intake air amount (amount of air-fuel mixture) per cycle is approximate to the intake air amount (amount of air-fuel mixture) per cycle in the operating cylinders at the time of high load operation during all-cylinder operation. This improves fuel economy of the engine 1 during low load operation.

On the other hand, when the engine operating state falls outside the above described reduced cylinder operation region G that is, falls within an all-cylinder operation region A, all-cylinder operation is carried out. During the all-cylinder operation, fuel injection by the fuel injection valves 4 and ignition by the ignition plugs 5 are performed for all cylinders, while the valve stop mechanisms 24 and 25 are deactivated to cause all the intake valves 9 and exhaust valves 10 to open and close.

In addition, in the present embodiment, a required flow rate DE, which is a target value related to the flow rate of blow-by gas, is calculated on the basis of an engine load KL and an engine rotational speed NE. The engine load KL is calculated on the basis of an intake air amount GA, and the like. The opening degree of the PCV valve 40 is controlled so as to obtain the required flow rate DE.

In the engine 1, as the engine load KL increases, the amount of blow-by gas increases. In addition, as the engine rotational speed NE increases, the amount of blow-by gas generated per unit time increases. Thus, to appropriately recirculate blow-by gas, the required flow rate DE is increased during high load operation or high rotational speed operation of the engine 1.

Incidentally, as described above, in the engine 1 with the cylinder cut-off mechanism, the intake pressure varies not only on the basis of an engine load but also on the basis of the number of operating cylinders. For example, the opening degree of the throttle valve 29 is controlled so that the intake air amount per cylinder increases as the number of operating cylinders reduces. Therefore, as the number of operating cylinders reduces, the intake pressure in the intake passage 3 increases. Thus, even when the opening degree of the PCV valve is the same, as the number of operating cylinders reduces, the flow rate of blow-by gas reduces.

Therefore, when the above described negative pressure PCV valve is used in the engine 1, there is a possibility that the flow rate of gas excessively reduces. In this case, scavenging of the inside of the crankcase 41 stagnates, so there is a concern that degradation of engine oil is inconveniently accelerated.

Figure 3:
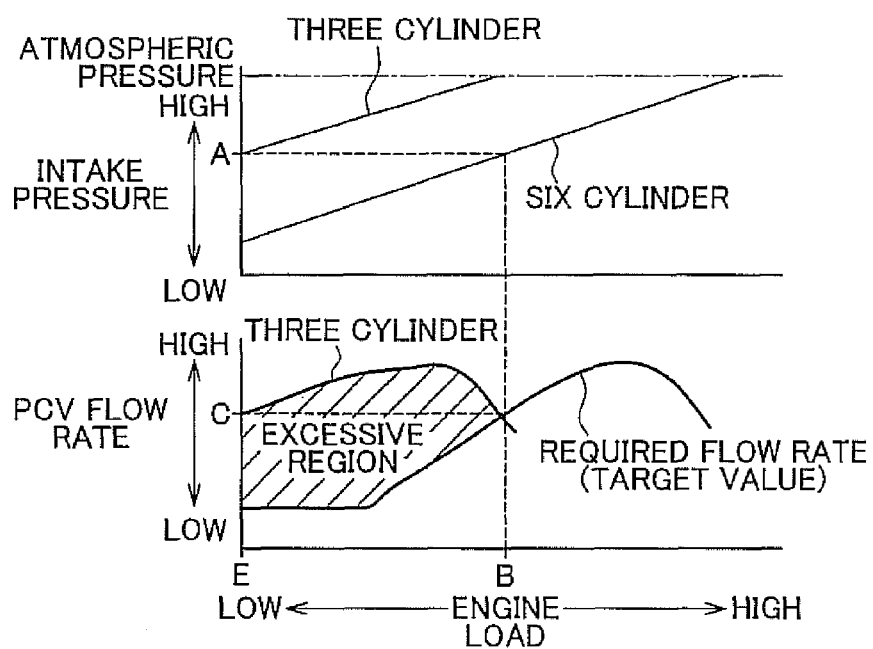
FIG. 3 is a graph that shows a variation in intake pressure due to a variation in the number of operating cylinders.

In addition, the opening degree characteristic of the negative pressure PCV valve is adjusted on the basis of an intake pressure so that the flow rate of blow-by gas increases as the intake pressure increases because of an increase in engine load. For example, as shown in FIG. 3, in a six-cylinder engine with no cylinder cut-off mechanism, when a required flow rate C is achieved at a certain engine load B, the opening degree characteristic of the negative pressure PCV valve is adjusted so that the opening degree of the PCV valve is adjusted by an intake pressure A at the engine load B to achieve the required flow rate C. When the thus configured negative pressure PCV valve is applied to, for example, a six-cylinder engine with a cylinder cut-off mechanism, the following inconvenience occurs. For example, as shown in FIG. 3, when the opening degree characteristic of the PCV valve is set with reference to a state where the number of operating cylinders is six, and when six-cylinder operation is being performed, the above intake pressure A is obtained at the engine load B, and then the required flow rate C is obtained. On the other hand, as the six-cylinder operation is switched into three-cylinder operation, the intake pressure increases, so the intake pressure A is obtained at an engine load E that is lower than the engine load B. In this case, although the engine load is lower than the engine load B, gas flows at the flow rate of gas corresponding to the required flow rate C based on the engine load B during six-cylinder operation as a PCV flow rate. Thus, the flow rate of gas excessively increases. In this way, when the flow rate of gas excessively increases, oil component contained in blow-by gas also excessively returns to the intake passage, so there is a concern that the amount of oil consumption inconveniently increases.

Then, in the present embodiment, the PCV valve 40 with an actuator is provided. The PCV valve 40 is able to selectively adjust its opening degree irrespective of an intake pressure. Then, by further executing the following opening degree setting process, the flow rate of blow-by gas may be appropriately controlled in the engine 1 with the cylinder cut-off mechanism, of which the relationship between the engine load and the intake pressure is not uniquely defined.

Note that the reduced cylinder operation is carried out on the basis of an engine load, so, basically, the opening degree of the PCV valve 40 may be adjusted on the basis of an engine load. However, the reduced cylinder operation may tend to cause a combustion state to become unstable. Therefore, even when the engine operating state falls within the reduced cylinder operation region G the reduced cylinder operation is prohibited, for example, when a coolant temperature is low. Thus, even at the same engine load, there are cases where the reduced cylinder operation is carried out and where the reduced cylinder operation is not carried out. By so doing, even when the engine load is the same, the intake pressure may vary, that is, the relationship between the engine load and the intake pressure may not be uniquely defined.

Figure 4:
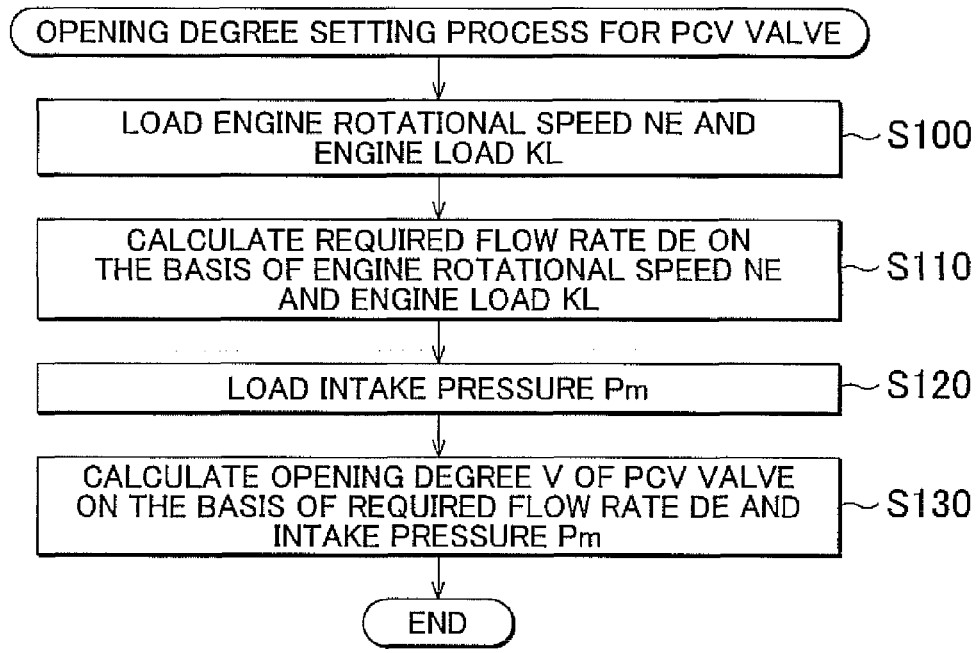
FIG. 4 is a flowchart that shows the procedure of opening degree setting process for a PCV valve according to the first embodiment.

FIG. 4 shows the procedure of opening degree setting process for the PCV valve 40. Note that the process is repeatedly executed at predetermined intervals by the control device 26. As the process starts, the engine rotational speed NE and the engine load KL are loaded (S100). Subsequently, a required flow rate DE in regard to the flow rate of blow-by gas is calculated on the basis of the engine rotational speed NE and the engine load KL (S110). As described above, the required flow rate DE is increased as the engine load KL increases or as the engine rotational speed NE increases.

Then, the intake pressure Pm is loaded (S120), and the opening degree V of the PCV valve 40 is calculated on the basis of the loaded intake pressure Pm and the set required flow rate DE (S130). Here, as the required flow rate DE increases, the opening degree V is increased. In addition, as the intake pressure Pm increases (negative pressure reduces), the opening degree V is increased. For example, a reference opening degree Vb is set on the basis of the required flow rate DE, and an opening degree correction value H is calculated so as to be increased as the intake pressure Pm increases. Then, the reference opening degree Vb is corrected by the opening degree correction value H to calculate the opening degree V.

As the opening degree V is calculated in this way, the process once ends. Then, a driving signal corresponding to the calculated opening degree V is input to the electric motor 40a of the PCV valve 40 to obtain the target value of the flow rate, that is, the required flow rate DE, of blow-by gas.

With the above described present embodiment, the following functions and advantageous effects may be obtained.

(1) In the engine 1 with the cylinder cut-off mechanism, the opening degree V of the PCV valve 40 corresponding to the required flow rate DE of gas returned to the blow-by gas passage is variably set on the basis of an intake pressure Pm in the intake passage 3. Thus, in the engine 1 of which the relationship between the engine load KL and the intake pressure Pm is not uniquely defined, when the PCV valve 40 with the electric motor 40a is provided to adjust the flow rate of blow-by gas, the flow rate of blow-by gas may be appropriately controlled.

(2) As the intake pressure Pm in the intake passage 3 increases, the flow rate of blow-by gas that passes through the PCV valve 40 reduces. Then, the opening degree V of the PCV valve 40 corresponding to the required flow rate DE (target value of the flow rate of gas) is configured to be increased as the intake pressure Pm in the intake passage 3 increases. By so doing, it is possible to adjust an actual flow rate of gas to the required flow rate DE.

Next, a control device for an internal combustion engine according to a second embodiment of the invention will be described with reference to FIG. 5.

As described above, in the engine 1 with the cylinder cut-off mechanism, the intake pressure Pm in the intake passage 3 varies on the basis of the number of operating cylinders. Then, in the first embodiment, the intake pressure Pm is detected, and then the opening degree V of the PCV valve 40, corresponding to the required flow rate DE, is variably set on the basis of the detected intake pressure Pm.

On the other hand, in the second embodiment, in the engine 1 with the cylinder cut-off mechanism, the opening degree V of the PCV valve 40, corresponding to the required flow rate DE, is variably set on the basis of the number of operating cylinders. Then, part of the opening degree setting process in the second embodiment differs from that of the first embodiment, and the intake pressure sensor 33 is omitted in the second embodiment. Then, hereinafter, the control device for an internal combustion engine according to the present embodiment will be described focusing on the above difference.

Figure 5:
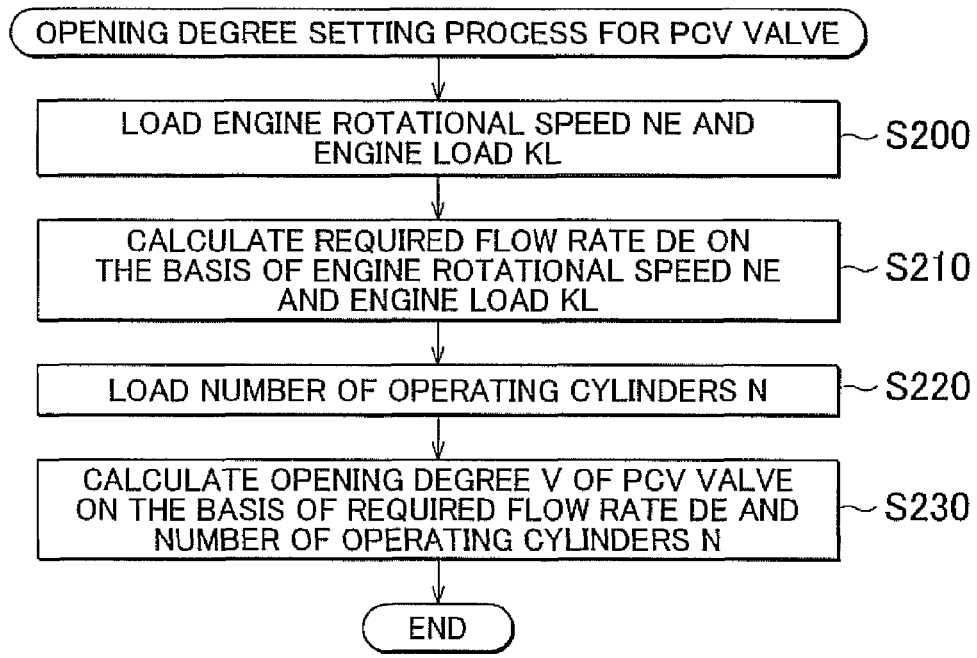
FIG. 5 is a flowchart that shows the procedure of opening degree setting process for a PCV valve according to a second embodiment.

FIG. 5 shows the procedure of opening degree setting process for the PCV valve 40 according to the second embodiment. Note that the process is also repeatedly executed at predetermined intervals by the control device 26. As the process starts, the engine rotational speed NE and the engine load KL are loaded (S200). Subsequently, a required flow rate DE in regard to the flow rate of blow-by gas is calculated on the basis of the engine rotational speed NE and the engine load KL (S210). As described above, the required flow rate DE is increased as the engine load KL increases or as the engine rotational speed NE increases.

Then, the number of currently operating cylinders N is loaded (S220), and then the opening degree V of the PCV valve 40 is calculated on the basis of the loaded number of operating cylinders N and the set required flow rate DE (S230). Here, as the required flow rate DE increases, the opening degree V is increased. In addition, as described above, the intake pressure Pm increases as the number of operating cylinders reduces, so the opening degree V is increased as the number of operating cylinders N reduces. For example, a reference opening degree Vb is set on the basis of the required flow rate DE, and an opening degree correction value H is calculated so as to be increased as the number of operating cylinders N increases. Then, the reference opening degree Vb is corrected by the opening degree correction value H to calculate the opening degree V.

As the opening degree V is calculated in this way, the process once ends. Then, a driving signal corresponding to the calculated opening degree V is input to the electric motor 40a of the PCV valve 40 to obtain the target value of the flow rate, that is, the required flow rate DE, of blow-by gas.

With the above described present embodiment, the following functions and advantageous effects may be obtained.

(3) In the engine 1 with the cylinder cut-off mechanism, the opening degree V of the PCV valve 40, corresponding to the required flow rate DE of gas returned to the blow-by gas passage, is variably set on the basis of the number of operating cylinders N. Thus, in the engine 1 of which the relationship between the engine load KL and the intake pressure Pm is not uniquely defined, when the PCV valve 40 with the electric motor 40a is provided to adjust the flow rate of blow-by gas, the flow rate of blow-by gas may be appropriately controlled.

(4) In the engine 1 with the cylinder cut-off mechanism, the opening degree of the throttle valve 29 is controlled so that the intake air amount per cylinder increases as the number of operating cylinders N reduces. Therefore, as the number of operating cylinders N reduces, the intake pressure Pm in the intake passage 3 increases. Thus, even when the opening degree of the PCV valve is the same, as the number of operating cylinders reduces, the flow rate of blow-by gas that passes through the PCV valve 40 reduces. Then, the opening degree V of the PCV valve 40, corresponding to the required flow rate DE (target value of the flow rate of gas), is configured to be increased as the number of operating cylinders N reduces and as the intake pressure Pm increases. By so doing, it is possible to adjust an actual flow rate of gas to the required flow rate DE.

(5) In addition, without providing the intake pressure sensor 33, which detects the intake pressure Pm, in the intake passage 3, it is possible to appropriately control the flow rate of gas.

Next, a control device for an internal combustion engine according to a third embodiment of the invention will be described with reference to FIG. 6 to FIG. 9.

The third embodiment differs from the first embodiment in that a variable valve mechanism that varies the valve characteristic of each intake valve 9 is provided instead of the cylinder cut-off mechanism, the intake pressure sensor 33 is omitted and part of the opening degree setting process for the PCV valve 40 is changed. Then, hereinafter, the control device according to the third embodiment will be described focusing on the above difference.

Figure 6:
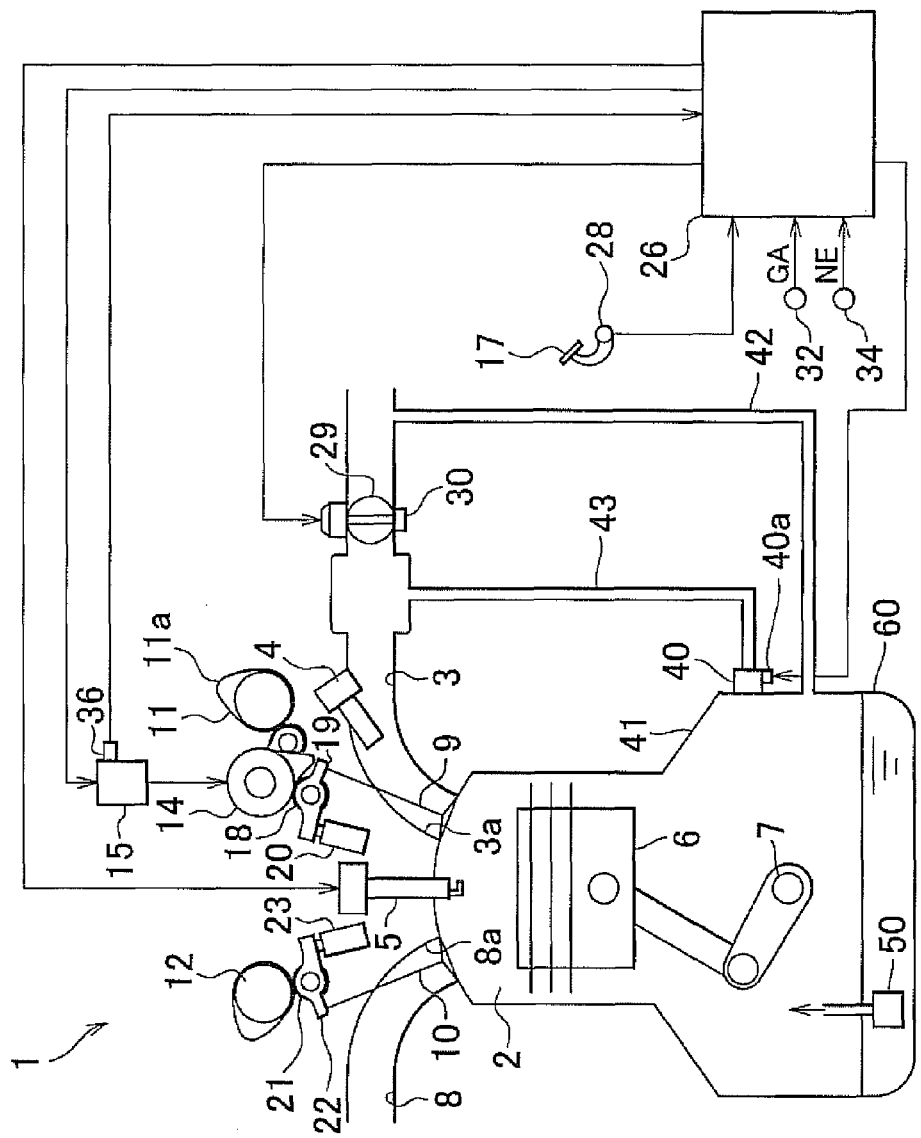
FIG. 6 is a schematic view that shows an internal combustion engine, to which a control device for an internal combustion engine according to a third embodiment of the invention is applied, and its peripheral configuration.

FIG. 6 shows the configuration of the engine 1 according to the third embodiment. As shown in FIG. 6, the engine 1 includes a variable valve lift mechanism 14 as the variable valve mechanism that varies the valve characteristic of each intake valve 9. The variable valve lift mechanism 14 is provided between the intake camshaft 11 and each rocker arm 19, and is driven by an electric motor 15.

Figure 7:
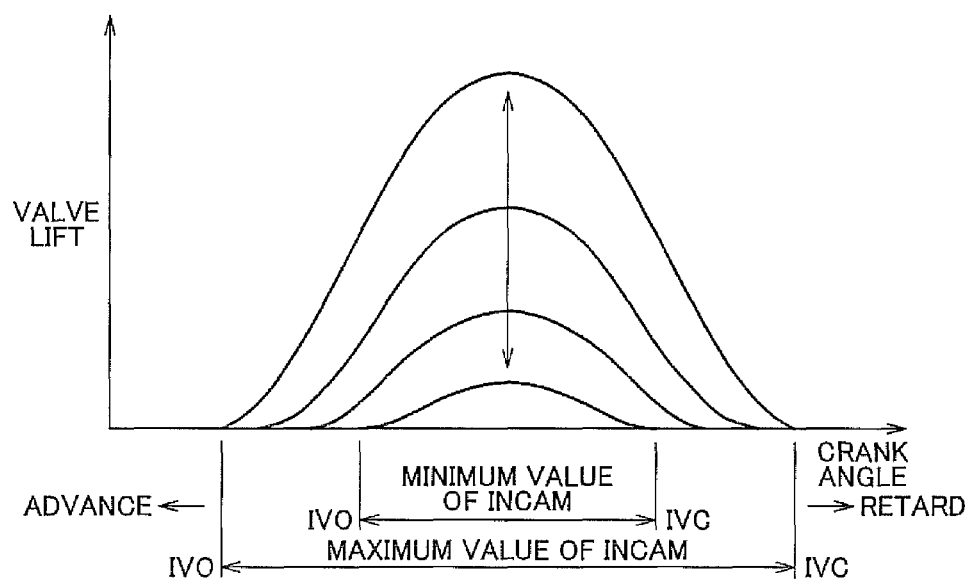
FIG. 7 is a graph that shows a variation in maximum valve lift and valve opening duration of an intake valve by a variable valve lift mechanism.

The variable valve lift mechanism 14 changes the maximum valve lift and valve opening duration INCAM of each intake valve 9 so as to be synchronized with each other as shown in FIG. 7. As the maximum valve lift VL increases, the valve opening duration INCAM also extends. In addition, when the valve opening duration INCAM is extended by driving the variable valve lift mechanism 14, the valve opening timing IVO of each intake valve 9 is advanced, and the valve closing timing IVC is retarded.

In addition, a valve lift sensor 36 is provided to detect the current maximum valve lift VL and the current valve opening duration INCAM by detecting an amount by which the electric motor 15 is driven. In the engine 1, normally, the throttle valve 29 is kept fully open, and the intake air amount is adjusted by adjusting the maximum valve lift VL and valve opening duration INCAM of each intake valve 9 by driving the variable valve lift mechanism 14. More specifically, as the accelerator operation amount increases and then an output request to the engine 1 increases, the maximum valve lift VL and the valve opening duration INCAM are increased, so the intake air amount is increased to obtain an engine output corresponding to the output request.

In this way, in the engine 1 with the variable valve lift mechanism 14 that varies the maximum valve lift VL and valve opening duration INCAM of each intake valve 9, the intake air amount is adjusted by varying the maximum valve lift VL and the valve opening duration INCAM instead of adjusting the intake air amount by the throttle valve 29. In the thus configured engine 1 as well, the intake pressure Pm corresponding to the engine load KL varies on the basis of the maximum valve lift VL and the valve opening duration INCAM. Thus, as in the case of the engine with the cylinder cut-off mechanism, the relationship between the engine load KL and the intake pressure Pm is not uniquely defined.

Figure 8:
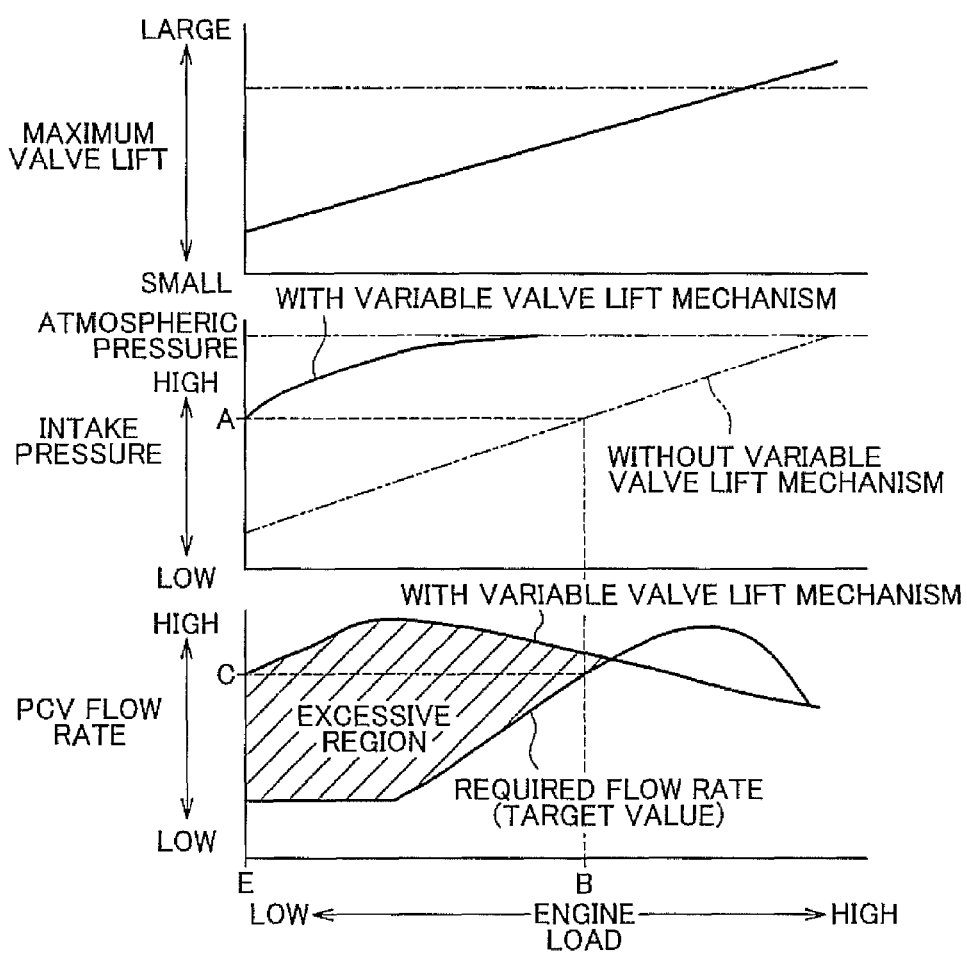
FIG. 8 is a graph that shows a variation in intake pressure due to a variation in maximum valve lift.

For example, as shown in FIG. 8, in the engine with no variable valve lift mechanism 14, when a required flow rate C is estimated at a certain engine load B, the opening degree characteristic of the negative pressure PCV valve is adjusted so that the opening degree of the PCV valve is adjusted on the basis of an intake pressure A at that engine load B to achieve the required flow rate C. When the thus configured negative pressure PCV valve is applied to an engine with the variable valve lift mechanism 14, the following inconvenience occurs. For example, as shown in FIG. 8, when the opening degree characteristic of the PCV valve is set with reference to a variation in intake pressure in the engine with no variable valve lift mechanism 14, if an intake pressure A is obtained at the engine load B, the required flow rate C is obtained at that intake pressure A. On the other hand, in the engine 1 with the variable valve lift mechanism 14, the intake pressure Pm basically increases, so the intake pressure A is obtained at an engine load E that is lower than the engine load B. In this case, although the engine load is lower than the engine load B, gas flows at the flow rate of gas corresponding to the required flow rate C based on the engine load B in the engine with no variable valve lift mechanism 14 as a PCV flow rate. Thus, the flow rate of gas excessively increases. In this way, when the flow rate of gas excessively increases, oil component contained in blow-by gas also excessively returns to the intake passage, so there is a concern that the amount of oil consumption inconveniently increases.

Then, in the present embodiment, the PCV valve 40 with an actuator is provided. The PCV valve 40 is able to selectively adjust its opening degree irrespective of an intake pressure. Then, by further executing the following opening degree setting process, the flow rate of blow-by gas may be appropriately controlled in the engine 1 with the variable valve lift mechanism 14, of which the relationship between the engine load and the intake pressure is not uniquely defined.

Note that the maximum valve lift VL and the valve opening duration INCAM are varied on the basis of the engine load, so, basically, the opening degree of the PCV valve 40 may be adjusted on the basis of the engine load. However, depending on the engine operating state (for example, the warm-up state, or the like, of the engine 1), the intake air amount may be adjusted by the throttle valve 29 instead of adjusting the intake air amount by varying the maximum valve lift VL and the valve opening duration INCAM. Thus, even at the same engine load, there is a case where the modes of adjusting the intake air amount are different from each other. By so doing, even when the engine load is the same, the intake pressure may vary, that is, the relationship between the engine load and the intake pressure may not be uniquely defined.

Figure 9:
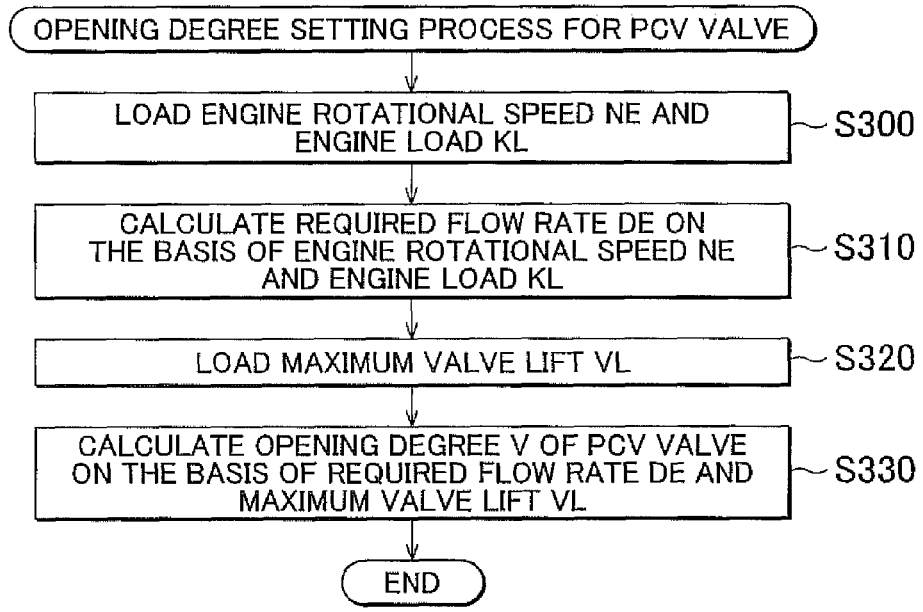
FIG. 9 is a flowchart that shows the procedure of opening degree setting process for a PCV valve according to the third embodiment.

FIG. 9 shows the procedure of opening degree setting process for the PCV valve 40 according to the present embodiment. Note that the process is also repeatedly executed at predetermined intervals by the control device 26. As the process starts, the engine rotational speed NE and the engine load KL are loaded (S300). Subsequently, a required flow rate DE in regard to the flow rate of blow-by gas is calculated on the basis of the engine rotational speed NE and the engine load KL (S310). As described above, the required flow rate DE is increased as the engine load KL increases or as the engine rotational speed NE increases.

Then, the current maximum valve lift VL is loaded (S320), and then the opening degree V of the PCV valve 40 is calculated on the basis of the loaded maximum valve lift VL and the set required flow rate DE (S330). Here, as the required flow rate DE increases, the opening degree V is increased. In addition, as shown in FIG. 8, the intake pressure Pm increases as the maximum valve lift VL increases, so the opening degree V is increased as the maximum valve lift VL increases. For example, a reference opening degree Vb is set on the basis of the required flow rate DE, and an opening degree correction value H is calculated so as to be increased as the maximum valve lift VL increases. Then, the reference opening degree Vb is corrected by the opening degree correction value H to calculate the opening degree V.

As the opening degree V is calculated in this way, the process once ends. Then, a driving signal corresponding to the calculated opening degree V is input to the electric motor 40a of the PCV valve 40 to obtain the target value of the flow rate, that is, the required flow rate DE, of blow-by gas.

With the above described present embodiment, the following functions and advantageous effects may be obtained.

(6) In the engine 1 with the variable valve mechanism that varies the valve characteristic of each intake valve 9, the opening degree V of the PCV valve 40 corresponding to the required flow rate DE of gas returned to the blow-by gas passage is variably set on the basis of the valve characteristic of the intake valve 9. Thus, in the engine 1 of which the relationship between the engine load KL and the intake pressure Pm is not uniquely defined, when the PCV valve 40 with the electric motor 40a is provided to adjust the flow rate of blow-by gas, the flow rate of blow-by gas may be appropriately controlled.

(7) In the engine 1 with the variable valve lift mechanism 14 that varies the maximum valve lift VL of each intake valve 9, as the maximum valve lift VL increases, the intake pressure Pm in the intake passage 3 increases. Thus, even when the opening degree of the PCV valve is the same, as the maximum valve lift VL increases, the flow rate of blow-by gas that passes the PCV valve 40 reduces. Then, the opening degree V of the PCV valve 40 corresponding to the required flow rate DE (target value of the flow rate of gas) is configured to be increased as the maximum valve lift VL increases and as the intake pressure Pm increases. By so doing, it is possible to adjust an actual flow rate of gas to the required flow rate DE.

(8) In addition, without providing the intake pressure sensor 33, which detects the intake pressure Pm, in the intake passage 3, it is possible to appropriately control the flow rate of gas.

Next, a control device for an internal combustion engine according to a fourth embodiment of the invention will be described with reference to FIG. 10 to FIG. 12.

The fourth embodiment differs from the third embodiment in that a variable valve timing mechanism 13 that varies the valve timing of each intake valve 9 is provided as the variable valve mechanism that varies the valve characteristic of each intake valve 9 instead of the variable valve lift mechanism 14 and part of the opening degree setting process for the PCV valve 40 is changed. Then, hereinafter, the control device according to the fourth embodiment will be described focusing on the above difference.

Figure 10:
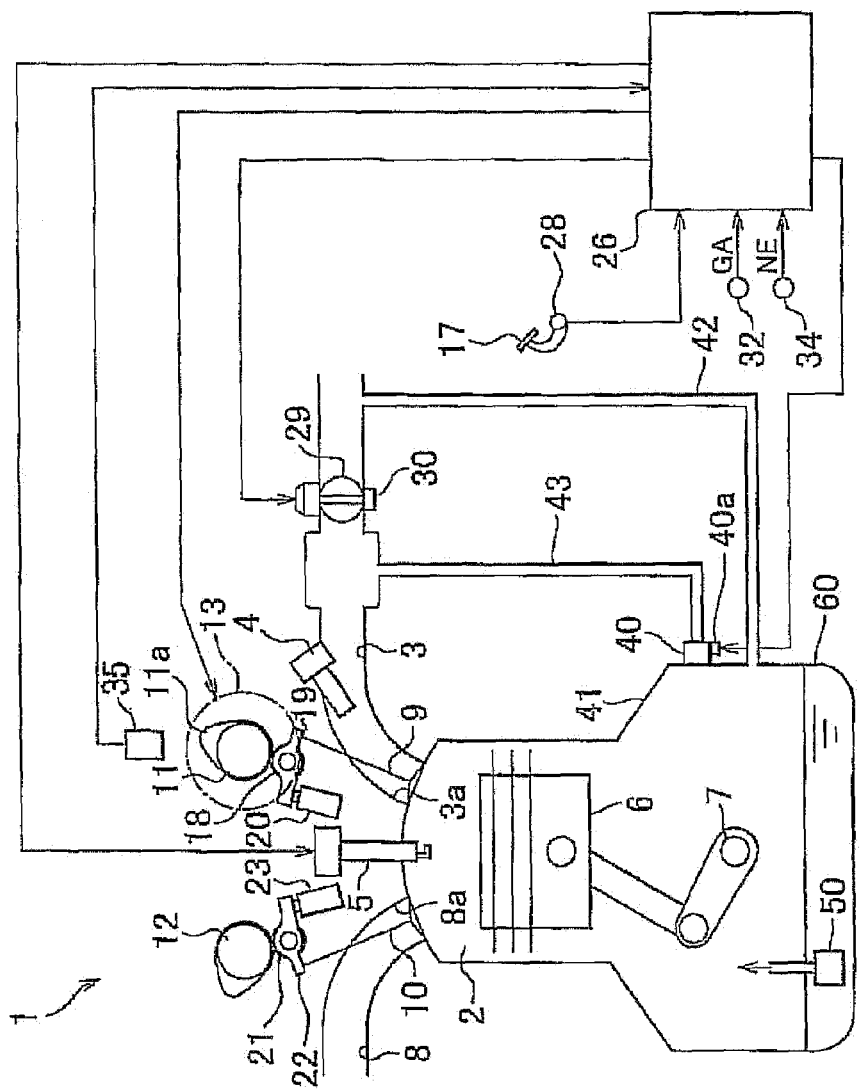
FIG. 10 is a schematic view that shows an internal combustion engine, to which a control device for an internal combustion engine according to a fourth embodiment of the invention is applied, and its peripheral configuration.
Figure 11:
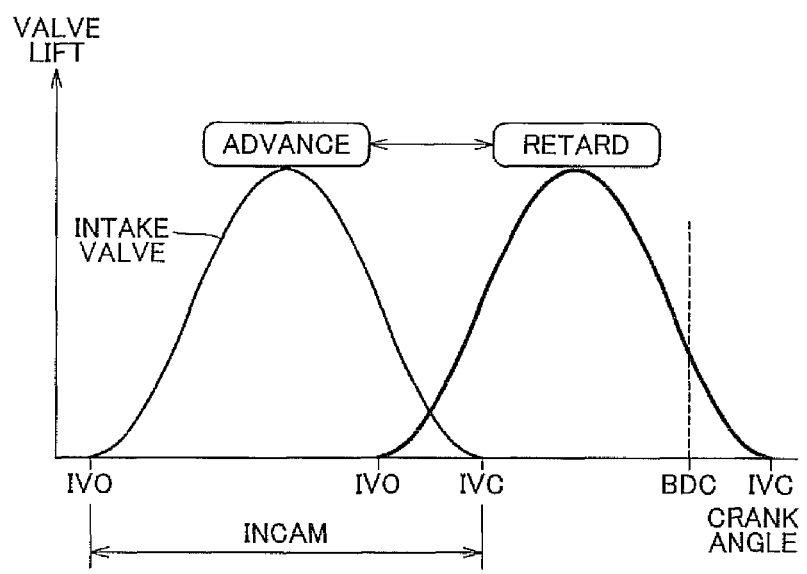
FIG. 11 is a graph that shows a variation in valve timing of an intake valve by a variable valve timing mechanism.

FIG. 10 shows the configuration of the engine 1 according to the fourth embodiment. As shown in FIG. 10, the engine 1 includes a hydraulically driven variable valve timing mechanism 13 as a variable valve mechanism that varies the valve characteristic of each intake valve 9. The hydraulically driven variable valve timing mechanism 13 is provided for the intake camshaft 11.

The variable valve timing mechanism 13 adjusts the rotational phase of the intake camshaft 11 with respect to the crankshaft 7 to vary the valve timing VT of each intake valve 9. Thus, as shown in FIG. 11, the variable valve timing mechanism 13 advances or retards both the valve opening timing IVO and valve closing timing IVC of each intake valve 9 while maintaining the valve opening duration INCAM of each intake valve 9 at constant.

In addition, a cam position sensor 35 is provided to output a signal corresponding to the rotational phase of the intake camshaft 11. In the engine 1, the target value of the valve timing VT is set on the basis of the intake air amount GA and the engine rotational speed NE, and the variable valve timing mechanism 13 is driven so that an actual valve timing VT detected by the cam position sensor 35 becomes the set target value.

In the engine 1 with the variable valve timing mechanism 13 that varies the valve timing VT of each intake valve 9, the pressure state in the intake passage 3 varies by varying the valve timing VT. For example, as the valve closing timing IVC of each intake valve 9 is retarded with respect to a bottom dead center, air introduced in a cylinder is blown back to the intake passage 3 during a compression stroke, so the intake pressure Pm in the intake passage 3 increases. In addition, when the valve overlap between each intake valve 9 and a corresponding one of the exhaust valves 10 is large, the intake pressure Pm in the intake passage 3 increases because of blow back from the exhaust passage 8 to the intake passage 3 or the influence of pressure in each cylinder. Thus, in the thus configured engine 1 with the variable valve timing mechanism 13 as well, the intake pressure Pm corresponding to the engine load KL varies on the basis of the valve timing VT, and, as in the case of the engine with the variable valve lift mechanism 14, the relationship between the engine load KL and the intake pressure Pm is not uniquely defined, so there is a concern about the above described inconvenience.

Then, in the fourth embodiment, the PCV valve 40 with an actuator is provided. The PCV valve 40 is able to selectively adjust its opening degree irrespective of an intake pressure. Then, by further executing the following opening degree setting process, the flow rate of blow-by gas may be appropriately controlled in the engine 1 with the variable valve timing mechanism 13, of which the relationship between the engine load and the intake pressure is not uniquely defined.

Note that the valve timing VT is varied on the basis of an intake air amount GA, or the like, that is, an engine load, or the like, so, basically, the opening degree of the PCV valve 40 may be adjusted on the basis of an engine load. However, depending on the engine operating state (for example, the warm-up state, or the like, of the engine 1), even at the same engine load, the set modes of the valve timing VT may vary. Thus, even at the same engine load, the intake pressure may vary, that is, the relationship between the engine load and the intake pressure may not be uniquely defined.

Figure 12:
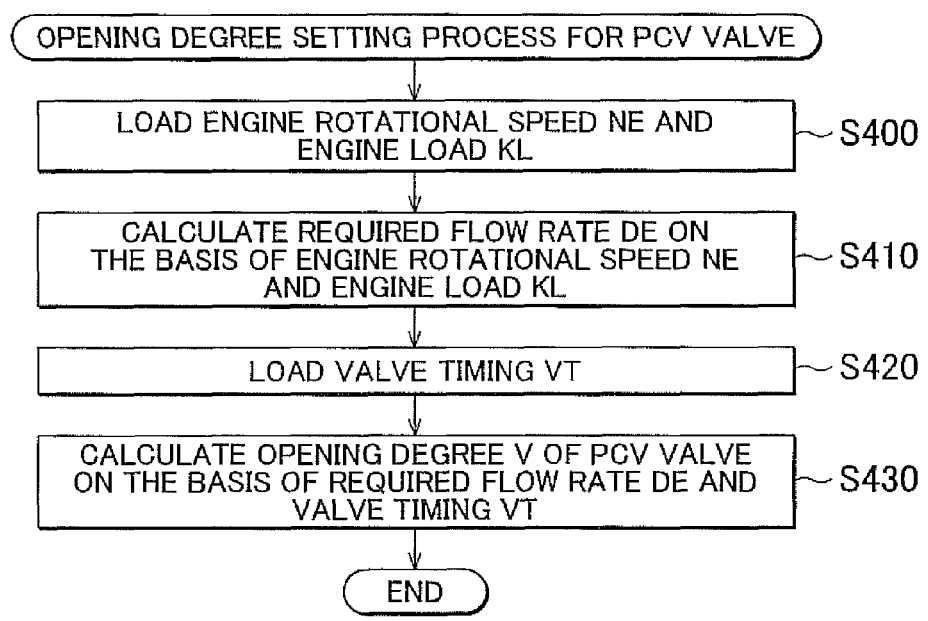
FIG. 12 is a flowchart that shows the procedure of opening degree setting process for a PCV valve according to the fourth embodiment.

FIG. 12 shows the procedure of opening degree setting process for the PCV valve 40 according to the fourth embodiment. Note that the process is repeatedly executed at predetermined intervals by the control device 26. As the process starts, the engine rotational speed NE and the engine load KL are loaded (S400). Subsequently, a required flow rate DE in regard to the flow rate of blow-by gas is calculated on the basis of the engine rotational speed NE and the engine load KL (S410). As described above, the required flow rate DE is increased as the engine load KL increases or as the engine rotational speed NE increases.

Then, the current valve timing VT is loaded (S420), and then the opening degree V of the PCV valve 40 is calculated on the basis of the loaded valve timing VT and the set required flow rate DE (S430). Here, as the required flow rate DE increases, the opening degree V is increased. In addition, because of the above described reason, when the valve closing timing IVC of each intake valve 9 is retarded with respect to the bottom dead center by varying the valve timing VT, the intake pressure Pm increases as the retarded amount from the bottom dead center increases, so the opening degree V is increased as the retarded amount from the bottom dead center increases. In addition, the intake pressure Pm tends to increase as the valve overlap increases by varying the valve timing VT, so the opening degree V is increased as the valve overlap increases. For example, a reference opening degree Vb is set on the basis of the required flow rate DE, and an opening degree correction value H is calculated so as to be increased as the retarded amount from the bottom dead center increases or as the valve overlap increases. Then, the reference opening degree Vb is corrected by the opening degree correction value H to calculate the opening degree V.

As the opening degree V is calculated in this way, the process once ends. Then, a driving signal corresponding to the calculated opening degree V is input to the electric motor 40a of the PCV valve 40 to obtain the target value of the flow rate, that is, the required flow rate DE, of blow-by gas.

With the above described present embodiment, the following functions and advantageous effects may be obtained.

(9) In the engine 1 with the variable valve mechanism that varies the valve characteristic of each intake valve 9, the opening degree V of the PCV valve 40, corresponding to the required flow rate DE of gas returned to the blow-by gas passage, is variably set on the basis of the valve characteristic of each intake valve 9. Thus, in the engine 1 of which the relationship between the engine load KL and the intake pressure Pm is not uniquely defined, when the PCV valve 40 with the electric motor 40a is provided to adjust the flow rate of blow-by gas, the flow rate of blow-by gas may be appropriately controlled.

(10) In the engine 1 with the variable valve timing mechanism 13 that varies the valve timing VT of each intake valve 9, the intake pressure Pm in the intake passage 3 varies by varying the valve timing VT. Therefore, even at the same opening degree of the PCV valve 40, when the valve timing VT varies, the flow rate of blow-by gas that passes through the PCV valve 40 also varies. Then, the opening degree V of the PCV valve 40, corresponding to the required flow rate DE (target value of the flow rate of gas), is configured to be increased as the intake pressure Pm in the intake passage 3 increases by varying the valve timing VT. By so doing, it is possible to adjust an actual flow rate of gas to the required flow rate DE.

(11) In addition, without providing the intake pressure sensor 33, which detects the intake pressure Pm, in the intake passage 3, it is possible to appropriately control the flow rate of gas.

Note that the above embodiments may be modified into the following alternative embodiments.

In the third embodiment and the fourth embodiment, the intake pressure sensor 33 may be provided in the intake passage 3 to execute opening degree setting process similar to that of the first embodiment. In the third embodiment, the valve opening duration INCAM may be used instead of the maximum valve lift VL to execute similar control.

The variable valve mechanism according to the third embodiment is a mechanism that varies both the maximum valve lift VL and valve opening duration INCAM of each intake valve 9. Other than the above, the variable valve mechanism may be a mechanism that varies only the maximum valve lift of each intake valve 9 or a mechanism that varies only the valve opening duration INCAM of each intake valve 9. Note that, when the variable valve mechanism that varies only the valve opening duration INCAM of each intake valve 9 is provided, the intake air amount increases as the valve opening duration INCAM extends, so the intake pressure Pm in the intake passage 3 increases. Thus, even at the same opening degree of the PCV valve 40, as the valve opening duration INCAM extends, the flow rate of blow-by gas that passes through the PCV valve 40 reduces. Then, the opening degree V of the PCV valve 40, corresponding to the required flow rate DE (target value of the flow rate of gas), is configured to be increased as the valve opening duration INCAM extends and as the intake pressure Pm in the intake passage 3 increases. By so doing, it is possible to adjust an actual flow rate of gas to the required flow rate DE.

The cylinder cut-off mechanism in the first and second embodiments is an example, and another mechanism may also be employed.

The aspect of the invention may be similarly applied to the one that drives the PCV valve 40 by an actuator other than the electric motor 40a.

The first to fourth embodiments and the alternative embodiments may be implemented in appropriate combinations suitable for the mechanism provided for the engine 1.

What is claimed is:

1. A control device for an internal combustion engine that includes:
   a blow-by gas recirculation system that has a blow-by gas passage that returns blow-by gas, flowing from a combustion chamber to a crank chamber, to an intake passage,
   a flow rate control valve that adjusts a flow rate of gas returned to the blow-by gas passage, and
   an actuator that adjusts an opening degree of the flow rate control valve so that the flow rate of gas becomes a target value, the target value of the flow rate of gas is calculated on the basis of an engine rotational speed of the engine and an engine load of the engine; and
   at least one of a cylinder cut-off mechanism that reduces the number of operating cylinders and a variable valve mechanism that varies a valve characteristic of an intake valve, the control device comprising:
   a variable flow rate control valve opening degree setting unit that variably sets an opening degree of the flow rate control valve by correcting a reference opening degree of the flow rate control valve by an opening degree correction value, the variable flow rate control valve opening degree setting unit calculates the reference opening degree on the basis of the target value and the variable flow rate control valve opening degree setting unit calculates the opening degree correction value on the basis of an intake pressure in the intake passage.

2. The control device for an internal combustion engine according to claim 1, wherein the opening degree of the flow rate control valve is increased as the intake pressure increases.

3. The control device for an internal combustion engine according to claim 1, wherein the variable valve mechanism varies at least one of a maximum valve lift of the intake valve and a valve opening duration of the intake valve.

4. The control device for an internal combustion engine according to claim 1, wherein the variable valve mechanism varies a valve timing of the intake valve.

5. A control device for an internal combustion engine that includes:
   a blow-by gas passage that returns blow-by gas, flowing from a combustion chamber to a crank chamber, to an intake passage;
   a flow rate control valve that adjusts a flow rate of gas returned to the blow-by gas passage;
   an actuator that adjusts an opening degree of the flow rate control valve so that the flow rate of gas becomes a target value, the target value of the flow rate of gas is calculated on the basis of an engine rotational speed of the engine and an engine load of the engine; and
   a cylinder cut-off mechanism that reduces the number of operating cylinders, the control device comprising:
   a variable flow rate control valve opening degree setting unit that variably sets an opening degree of the flow rate control valve by correcting a reference opening degree of the flow rate control valve by an opening degree correction value, the variable flow rate control valve opening degree setting unit calculates the reference opening degree on the basis of the target value and the variable flow rate control valve opening degree setting unit calculates the opening degree correction value on the basis of the number of operating cylinders.

6. The control device for an internal combustion engine according to claim 5, wherein the opening degree of the flow rate control valve is increased as the number of operating cylinders reduces.

7. A control device for an internal combustion engine that includes:
   a blow-by gas passage that returns blow-by gas, flowing from a combustion chamber to a crank chamber, to an intake passage;
   a flow rate control valve that adjusts a flow rate of gas returned to the blow-by gas passage;
   an actuator that adjusts an opening degree of the flow rate control valve so that the flow rate of gas becomes a target value, the target value of the flow rate of gas is calculated on the basis of an engine rotational speed of the engine and an engine load of the engine; and
   a variable valve mechanism that varies a valve characteristic of an intake valve, the control device comprising:
   a variable flow rate control valve opening degree setting unit that variably sets an opening degree of the flow rate control valve by correcting a reference opening degree of the flow rate control valve by an opening degree correction value, the variable flow rate control valve opening degree setting unit calculates the reference opening degree on the basis of the target value and the variable flow rate control valve opening degree setting unit calculates the opening degree correction value on the basis of the valve characteristic of the intake valve.

8. The control device for an internal combustion engine according to claim 7, wherein
   the variable valve mechanism varies a maximum valve lift of the intake valve, and the opening degree of the flow rate control valve is increased as the maximum valve lift increases.

9. The control device for an internal combustion engine according to claim 7, wherein
   the variable valve mechanism varies a valve opening duration of the intake valve, and
   the opening degree of the flow rate control valve is increased as the valve opening duration extends.

10. The control device for an internal combustion engine according to claim 7, wherein
    the variable valve mechanism varies a valve timing of the intake valve, and the opening degree of the flow rate control valve is increased as an intake pressure in the intake passage increases by varying the valve timing of the intake valve.

11. A control method for an internal combustion engine that includes
- a blow-by gas recirculation system that has a blow-by gas passage that returns blow-by gas, flowing from a combustion chamber to a crank chamber, to an intake passage, and a flow rate control valve that adjusts a flow rate of gas returned to the blow-by gas passage; and
- at least one of a cylinder cut-off mechanism that reduces the number of operating cylinders and a variable valve mechanism that varies a valve characteristic of an intake valve, the control method comprising:
- loading an engine rotational speed and engine load of the internal combustion engine;
- calculating a required flow rate of blow-by gas on the basis of the loaded engine rotational speed and the loaded engine load;
- loading an intake pressure in the intake passage;
- calculating a reference opening degree on the basis of the required flow rate of the blow-by gas;
- calculating an opening degree correction value on the basis of the intake pressure in the intake passage;
- setting an opening degree of the flow rate control valve by correcting the reference opening degree by the opening degree correction value; and
- adjusting an opening degree of the flow rate control valve so as to become the calculated opening degree of the flow rate control valve.

* * * * *